Feb. 27, 1940.　　W. R. MILLER　　2,192,144
TEMPERATURE CONTROL SYSTEM
Filed Oct. 15, 1936　　4 Sheets-Sheet 1

Inventor
Wayland R. Miller
By George H Fisher
Attorney

Feb. 27, 1940.          W. R. MILLER          2,192,144
TEMPERATURE CONTROL SYSTEM
Filed Oct. 15, 1936          4 Sheets-Sheet 4

Inventor
Wayland R. Miller
By George H Fisher
Attorney

Patented Feb. 27, 1940

2,192,144

UNITED STATES PATENT OFFICE 2,192,144

TEMPERATURE CONTROL SYSTEM

Wayland R. Miller, Nashotah, Wis., assignor to Minneapolis-Honeywell Regulator Company, Minneapolis, Minn., a corporation of Delaware Application October 15, 1936, Serial No. 105,839

12 Claims. (Cl. 236—91)

This invention relates to temperature control systems in general and more particularly to the type of temperature control system shown and described in application Serial No. 512,887 filed by Daniel G. Taylor on February 2, 1931, now U. S. Patent No. 2,065,835.

The system disclosed in the above referred to Taylor application comprises an outdoor controller responsive to outdoor atmospheric conditions including temperature, wind and solar radiation, for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device operating on a temperature differential is provided for responding to the temperature within the outdoor controller and when this thermostatic device calls for heat both of the heating means are energized to deliver heat to the building and to the outdoor controller. Due to the proportional relationship of the heating means with the heat losses of the building and the outdoor controller a definite temperature relation may be maintained within the building and the outdoor controller so that by responding to the temperature of the outdoor controller the thermostatic device maintains a substantially constant or normal temperature within the building.

In adjusting the temperature control system of the Taylor application, various factors of operation must be ascertained. The design temperature of the building must be determined, that is, the outdoor temperature at which the heating equipment must be operated 100% of the time to maintain the desired temperature within the building. The outdoor temperature at which no heat is to be supplied to the building must also be determined. Further, the time which the heating apparatus must be turned on to completely saturate the radiators during mild weather must also be determined. Having ascertained these various conditions, the outdoor controller is adjusted accordingly. The contacts of the outdoor controller are adjusted so that the outdoor controller will turn on the building heating means and the outdoor controller heating means when the temperature of the outdoor controller drops to a predetermined value and the differential is adjusted so that the building heating means and the outdoor controller heating means will be turned off when the temperature of the outdoor controller rises to a predetermined higher value. The amount of heat supplied to the outdoor controller is adjusted in order to maintain the above referred to proportional relationship. All of these various adjustments are made by means of empirical charts.

After the outdoor controller has been adjusted and it is found that underheating occurs during cold weather, this means that the design temperature of the building has been chosen too low and therefore the amount of heat supplied to the outdoor controller must be decreased. If overheating occurs during cold weather, this is an indication that the design temperature has been chosen too high and the amount of heat supplied to the outdoor controller must be increased. If underheating occurs during mild weather, this is an indication that the cut-in point has been chosen too low and the contact settings of the outdoor controller must be raised. If overheating occurs during mild weather, the contact settings must be lowered since the cut-in point of the outdoor controller has been chosen too high.

Since the outdoor controller is located on the outside of the building or on the roof and since to properly adjust the outdoor controller the contact settings must be adjusted, the service man installing and adjusting the temperature control system of the Taylor application must climb out on the building to make the various adjustments. This manner of adjustment is quite inconvenient and requires a great deal of time of the installing and service men, thus adding to the cost of maintenance.

It is therefore an object of this invention to provide a means whereby the control system of the Taylor application may be completely adjusted from a remote point such as in the basement of the building. This may be accomplished in various manners as pointed out in the following specification and these also form objects of this invention.

Further, it may also be desirable to allow the building engineer to adjust slightly the control system for varying outdoor conditions and this may easily be accomplished by the remotely located adjusting means.

It is found also that when the supply of heat to the outdoor controller is adjusted both the on periods and the off periods of the heating system are varied and it is also found that when the contact settings are changed both the on periods and the off periods are varied. By reason of this, the setting of the temperature control system of the Taylor application becomes quite complex and intricate.

It is therefore another object of this invention to provide a temperature control system wherein the on period may be adjusted while the off period is maintained substantially constant and, vice versa, the off period may be adjusted while the on period is maintained substantially constant. By reason of this independent adjustment of the on and off periods of the temperature control system, the adjustment of the system is made more simple and fewer adjustments are required to place the system in a satisfactory operating condition. The various manners for accomplishing this type of adjustment are also set forth in detail in the following specification and these also form objects of this invention.

Other objects and advantages will become apparent to those skilled in the art upon reference to the accompanying specification, claims and drawings.

For a more thorough understanding of my invention, reference is made to the accompanying drawings, in which:

Figure 1 discloses one form of my invention wherein the temperature control system may be adjusted from a remote point and wherein the on periods and the off periods may be adjusted with respect to each other;

Figure 6 is a further modification of this invention wherein a heater is utilized for directly affecting the thermostatic element contained in the outdoor controller;

Figure 1:
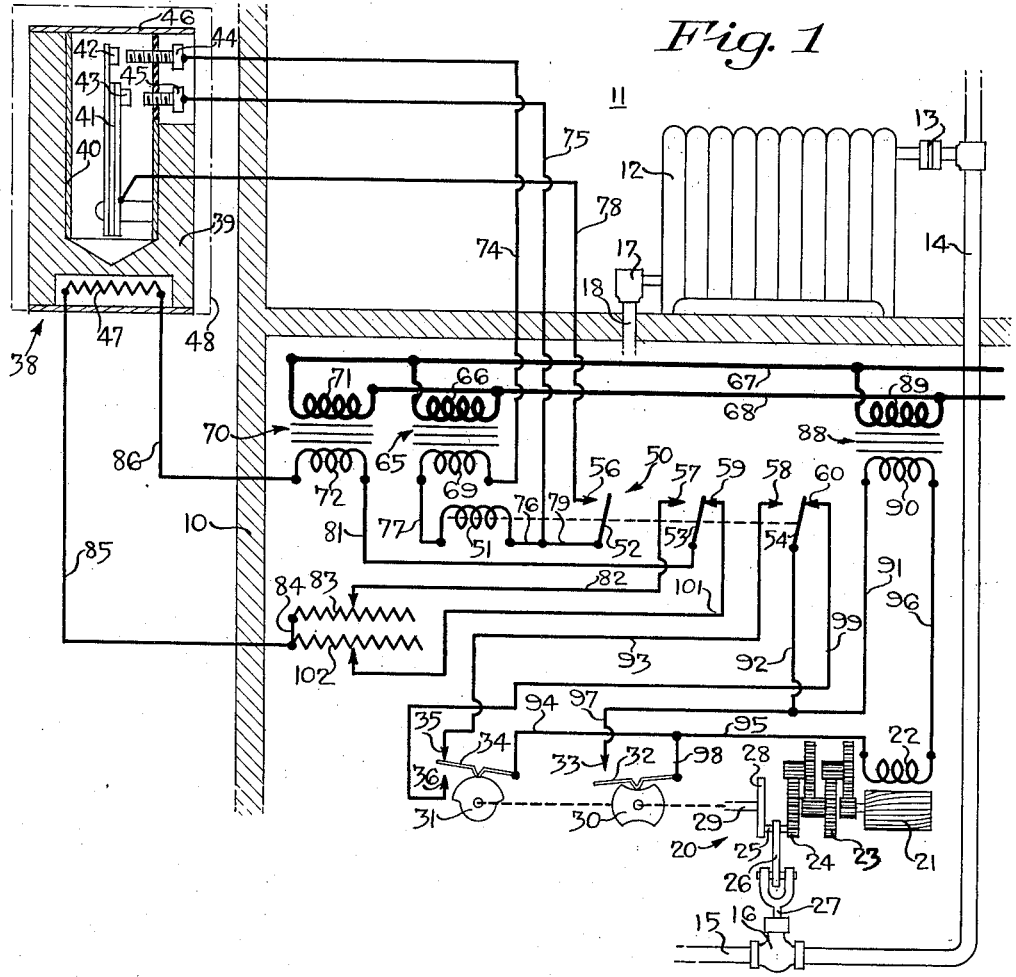

Referring to Figure 1, there is illustrated a building having an outside wall 10 and a plurality of rooms, one of which is shown at 11. Located in the room 11 is a heat exchanger or radiator 12 which is supplied with heating fluid through an orifice 13 from a riser 14 leading from a heating fluid supply pipe 15. The supply of heating fluid to the radiator or heat exchanger 12 is controlled by means of a valve 16. For purposes of illustration it is assumed that the heating fluid is steam supplied from some source, not shown, although other types of heating fluid may be utilized and still be within the contemplation of this invention. Heating fluid is withdrawn from the heat exchanger or radiator 12 through a steam trap 17 by means of a discharge pipe 18.

The valve 16 may be operated by a motor generally designated at 20 which may comprise a rotor 21 placed in operation by a field winding 22. The rotor 21 operates through a reduction gear train 23 to operate a crank disc 24 carrying a crank pin 25. The crank pin 25 is connected by a pitman 26 to the valve stem 27 of the valve 16. The crank pin 25 is also mounted on a crank disc 28 which, in turn, operates a shaft 29. The shaft 29 carries cams 30 and 31, the cam 30 operating a switch arm 32 with respect to a contact 33 and the cam 31 operating a switch arm 34 with respect to contacts 35 and 36. The switch arm 32 performs a maintaining function for the motor 20 and the switch arm 34 performs a cycling function. The arrangement is such that when the valve 16 is closed the switch arm 34 engages the contact 35 and when the valve 16 is open the switch arm 34 engages the contact 36.

The outdoor controller is generally designated at 38 and may comprise a mass in the form of a metallic block 39 which is hollowed out to receive a container 40. Suitably mounted within the container 40 is a bimetallic element 41 which operates contacts 42 and 43 with respect to contacts 44 and 45. The metallic block 39 is provided with a cover 46 so that the bimetallic element 41 responds directly to the temperature of the block 39. The block 39 is heated by means of a heater 47 and is cooled by outdoor atmospheric conditions including outdoor temperature and the effects of wind and solar radiation. The controller 38 may be protected from the elements by a cover 48. Upon a decrease in block temperature, the contact 42 first engages the contact 44 and upon a further decrease in temperature, the contact 43 then engages the contact 45. Upon an increase in block temperature, the contact 43 first disengages the contact 45 and then the contact 42 disengages the contact 44. The contacts 44 and 45 are made adjustable for reasons to be pointed out more fully hereinafter.

A relay is generally designated at 50 and comprises a relay coil 51 for operating switch arms 52, 53 and 54. The arrangement is such that when the relay coil 51 is energized switch arms 52, 53 and 54 are moved into engagement with contacts 56, 57 and 58, respectively. When the relay coil is deenergized, the switch arms are moved out of engagement with their respective contacts and the switch arms 53 and 54 are moved into engagement with contacts 59 and 60, this latter movement of the switch arms being accomplished by means of springs, gravity or other means, not shown.

A step-down transformer is generally indicated at 65 and comprises a primary 66 connected across line wires 67 and 68 leading from some source of electrical power, not shown, and a secondary 69. A second step-down transformer is generally indicated at 70 and comprises a primary 71 also connected across the line wires 67 and 68 and a secondary 72.

When the temperature of the block 39 decreases sufficiently to cause contacts 42 and 43 and contacts 44 and 45 to engage, a circuit is completed from the secondary 69 through wire 74, contacts 44, 42, 43 and 45, wires 75 and 76, relay coil 51 and wire 77 back to the secondary 69. Completion of this circuit causes movement of the switch arms 52, 53 and 54 into engagement with the contacts 56, 57 and 58. Movement of the switch arm 52 into engagement with the contact 56 completes a maintaining circuit for the relay 50 which may be traced from the secondary 69 through wire 74, contacts 44 and 42, bimetallic element 41, wire 78, contact 56, switch arm 52, wires 79 and 76, relay coil 51 and wire 77 back to the secondary 69. Completion of this maintaining circuit maintains the relay coil 51 energized until such time as the temperature of the block 39 has increased sufficiently to disengage contacts 42 and 44.

Movement of the switch arm 53 into engagement with contact 57 completes a heater circuit for the outdoor controller 38 which may be traced from secondary 72 through wire 81, switch arm 53, contact 57, wire 82, variable resistance 83, wires 84 and 85, heater 47, and wire 86 back to the secondary 72. In this manner, whenever the outdoor controller is calling for heat so as to maintain the relay 50 energized, heat is supplied to the outdoor controller to raise the temperature thereof and the amount of heat so supplied to the outdoor controller is adjusted by means of the variable resistance 83.

A third step-down transformer is generally designated at 88 which comprises a primary 89 connected across the line wires 67 and 68 and a secondary 90. Movement of the switch arm 54 into engagement with the contact 58 completes a circuit from the secondary 90 through wires 91 and 92, switch arm 54, contact 58, wire 93, contact 35, switch arm 34, wires 94 and 95, field winding 22 and wire 96 back to the secondary 90. Completion of this circuit causes energization of field winding 22 to start operation of the motor 20 to move the valve 16 to an open position. When the valve 16 has been started in its opening movement, the cam 30 moves the switch arm 32 into engagement with the contact 33 to complete a maintaining circuit for the field winding 22 which may be traced from the secondary 90 through wires 91 and 97, contact 33, switch arm 32, wires 98 and 95, field winding 22 and wire 96 back to the secondary 90. This maintaining circuit maintains the field winding 22 energized until the valve 16 has been moved to a full open position at which time the switch arm 32 moves out of engagement with the contact 33 to break the maintaining circuit. Also at this time the switch arm 34 is in engagement with the contact 36 to position the motor 20 for closing operation when the switch arm 54 moves into engagement with the contact 60.

When the relay 50 is deenergized so as to move the switch arm 54 into engagement with the contact 60, this occurring when the outdoor controller is satisfied, a valve closing circuit is completed from the secondary 90 through wires 91 and 92, switch arm 54, contact 60, wire 99, contact 36, switch arm 34, wires 94 and 95, field winding 22, and wire 96 back to the secondary 90. Valve 16 is thus started toward its closed position and closing movement of the valve is insured by means of the maintaining circuit outlined above. From the above it is seen that when the outdoor controller is calling for heat the valve 16 is open to supply heating fluid to the building and when the outdoor controller is satisfied the valve 16 is closed to prevent the further supply of heat to the building.

This structure and mode of operation which omits the contact 59 of relay 50 and its associated wiring is in all respects similar to the disclosure set forth in the above referred to Taylor application. Namely, when the outdoor controller calls for heat, heat is supplied to the outdoor controller and the building and when the outdoor controller is satisfied the supply of heat to the outdoor controller and the building is shut off.

Let it be assumed that the design temperature of the building is 0° F., that no heat need be supplied to the building when the outdoor temperature rises to 70°, that the outdoor controller contacts are adjusted so that the heating apparatus will be turned on when the temperature of the outdoor controller decreases to 67½° and will be turned off when the temperature increases to 72½°, that each watt of heat supplied to the outdoor controller is sufficient to maintain the temperature of the outdoor controller 10° above the ambient temperature, and that the variable resistance 83 is so adjusted as to supply 7 watts of heat to the outdoor controller. Therefore, when the outdoor temperature is at the design temperature, to wit 0°, the heating apparatus will be maintained in operation 100% of the time since the application of 7 watts of heat is not quite enough to raise the block temperature to 72½°. When the outdoor temperature is 70°, the heating apparatus will be maintained in the off condition since the block temperature cannot under these conditions decrease to 67½° to turn on the heating apparatus. When the outdoor temperature is 35°, the heating apparatus will be operating 50% of the time. Such a setting of the system is shown by the line A in the chart of Figure 2. Therefore, for any given outdoor temperature, the heating apparatus will be on for a given percent of time.

If the design temperature and the cut-in temperature have been properly selected and if the amount of heat supplied to the outdoor controller and the contact settings have been properly selected, the temperature control system will operate in the desired manner to maintain a substantially constant temperature within the building.

If after the control system has been adjusted in the manner pointed out above, it is found that the system works satisfactorily during cold weather and underheats during mild weather, this is an indication that the design temperature has been chosen properly but that the average temperature setting of the outdoor controller has been chosen too low. Therefore, the average temperature setting of the outdoor controller must be raised and still maintain the design temperature constant. This may be accomplished, for example, by increasing the average temperature setting of the contacts from 70° to 80° and adjusting the variable resistance to supply 8 watts of heat to the outdoor controller. With the controller so adjusted, it follows the curve B of the chart of Figure 2. Curve B therefore represents the application of 8 watts of heat to the outdoor controller with a contact setting of 80°.

If on the other hand, it be found that the control system operates satisfactorily during severe weather but that it overheats during mild weather, the average temperature setting of the outdoor controller must be reduced while maintaining the design temperature the same. This may be accomplished by lowering the average temperature setting from 70° to 60° and decreasing the number of watts supplied to the outdoor controller to 6 watts. These conditions are indicated by the curve C.

From the above it is seen that when overheating or underheating occurs during mild weather, both the contacts of the outdoor controller and the variable resistance 83 must be adjusted in order to get satisfactory operation.

If it be found that the control system operates satisfactorily during mild weather but overheats during severe weather, this means that the average temperature setting of the contacts has been chosen correctly but that the selection of the design temperature was incorrect. Less heat must be supplied to the outdoor controller during severe conditions and this may be accomplished, for example, by adding 8 watts of heat to the outdoor controller instead of 7. These conditions are graphically illustrated by the curve D of Figure 2.

If the system underheats during severe weather but operates satisfactorily during mild weather, the design temperature of the system must be raised and this may be accomplished by adding only 6 watts of heat to the outdoor controller. These conditions are disclosed by curve E in Figure 2.

Figure 2:
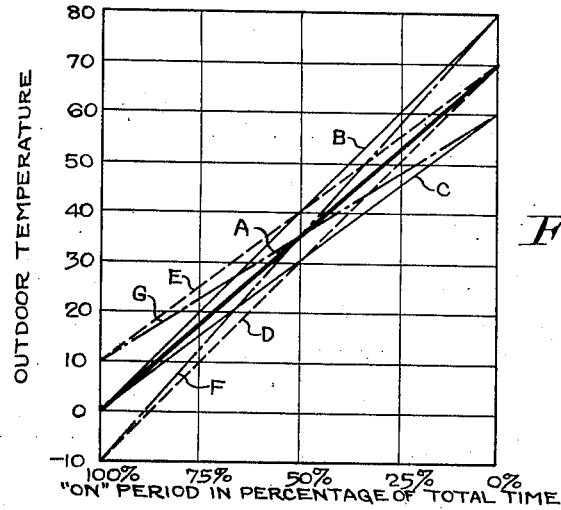
Figure 2 is a time temperature chart showing the on period of the heating equipment in percent of total time for a given outdoor temperature, this chart being applicable to the above referred to Taylor application and to the various systems disclosed in this application.

Curve F of Figure 2 shows the setting of the outdoor controller to correct for both overheating during severe weather and underheating during mild weather. Curve F represents the application of 9 watts of heat to the outdoor controller with a contact setting of 80°. Curve G represents the setting of the outdoor controller to compensate for underheating during severe weather and overheating during mild weather. Curve G represents a setting wherein 5 watts of heat are applied to the outdoor controller with a contact setting of 60°.

Tabulated below with respect to the various time temperature curves illustrated in Figure 2 are the contact settings of the outdoor controller of the above referred to Taylor application and the amount of heat supplied to the outdoor controller:

A—7 watts—70°;
B—8 watts—80°;
C—6 watts—60°;
D—8 watts—70°;
E—6 watts—70°;
F—9 watts—80°;
G—5 watts—60°.

From the above it is seen that in adjusting the outdoor controller to obtain uniform temperature control during mild weather conditions as well as during severe weather conditions, the contact settings must be adjusted as well as the amount of heat supplied to the outdoor controller. As pointed out above, the outdoor controller is located outside of the building or on the roof and in order to adjust the contact settings of the outdoor controller the installation men or service men must climb outside of the building or up on the roof to make the proper adjustments. This takes quite a bit of time of these men and necessarily involves quite an expense. This difficulty may be remedied by the complete system shown in Figure 1 wherein all the adjustments may be made from a remote point. In Figure 1, it is seen that the relay 50 has an out contact 59 engaged by the switch arm 53 when the outdoor controller 38 is satisfied. Therefore, when the outdoor controller is satisfied, a circuit is completed from the secondary 72 through wire 81, switch arm 53, contact 59, wire 101, variable resistance 102, wire 85, heater 47, and wire 86 back to the secondary 72. In this manner heat may be supplied to the outdoor controller when the outdoor controller is satisfied to slow down the rate of cooling of the outdoor controller. The amount of heat supplied to the outdoor controller at this time and therefore the rate of cooling of the outdoor controller may be adjusted by the variable resistance 102.

Assume now that the contact settings of the outdoor controller 38 are set at 77½° and 82½° to give an average temperature of 80° and that 1 watt of heat is added to the outdoor controller all the time, the outdoor controller will therefore be maintained at an average temperature of 80° but the effective controlling temperature setting of the outdoor controller will be substantially 70° since the application of 1 watt of heat to the outdoor controller all the time maintains the temperature thereof an additional 10° above ambient temperature. This additional 1 watt of heat supplied to the outdoor controller all the time may be accomplished by adjusting the resistance 83 to supply 8 watts of heat to the outdoor controller during the on period and adjusting the variable resistance 102 to supply 1 watt of heat to the controller during the off period. With the various parts so adjusted, an outdoor temperature of 0° will maintain the relay 50 and consequently the heating system energized 100% of the time since the application of 8 watts of heat is not quite enough to raise the block temperature to 82½°. Also, when the outdoor temperature rises to 70°, the heating system will remain off all of the time since the 1 watt of heat will maintain the block temperature above 77½°. Further, if the outdoor temperature should increase to 35°, the heating apparatus will be maintained in operation 50% of the time. Therefore, it is seen that the complete control system of Figure 1 when adjusted in this manner also follows the curve A of Figure 2. Although the contacts are set for an 80° temperature setting, the continuous application of 1 watt of heat to the outdoor controller makes the effective controlling temperature of the outdoor controller 70°. The complete system as disclosed in Figure 1 operates identical to the system disclosed in the above referred to Taylor application.

If after the control system has been adjusted in the manner pointed out immediately above, it is found that the system works satisfactorily during cold weather and underheats during mild weather, this is an indication that the correct amount of heat is being delivered during cold weather but insufficient heat is being delivered during mild weather. This may be remedied by shortening the cooling or off period of the outdoor controller. Therefore, if 0 watts of heat, for example, are supplied during the off period, the outdoor temperature must rise to 80° in order to prevent the supply of heat to the building. These conditions are represented by curve B of Figure 2 wherein 8 watts of heat are supplied to the outdoor controller during the on period and 0 watts of heat are supplied to the outdoor controller during the off period. In this manner, the time temperature relationship of the heating system with these settings is the same as that of the above referred to Taylor application when 8 watts of heat are supplied to the outdoor controller of the Taylor application with an 80° contact setting.

If on the other hand, it is found that the control system operates satisfactorily during severe weather but that it overheats during mild weather, less heat should be supplied during mild weather. This may be accomplished, for example, by adding 2 watts of heat to the outdoor controller during the off period in order to slow down the rate of cooling of the outdoor controller. If 2 watts of heat are supplied during the off period, the control system will not deliver heat when the outdoor temperature rises to 60°. Therefore, the control system with 8 watts of heat supplied during the on period and 2 watts of heat supplied during the off period will operate in accordance with curve C of Figure 2.

From the above it is seen that when over heating or underheating occurs during mild weather, only the variable resistance 102 which controls the supply of heat to the outdoor controller during the off period need be adjusted. Therefore, climbing up on the roof or on the outside of the building to adjust the contact settings as is necessary in the Taylor system is not required in the improved complete system of Figure 1.

If it be found that the control system operates satisfactorily during mild weather but overheats during severe weather, this means that the selection of the design temperature was incorrect. Less heat must be supplied to the outdoor controller during severe conditions and this may be accomplished, for example, by adding 9 watts of heat during the on period with 1 watt of heat during the off period. The operation of the system so adjusted will follow the curve D of Figure 2.

If the system underheats during severe weather but operates satisfactorily during mild weather, the design temperature of the system must be raised and this may be accomplished by supplying 7 watts of heat during the on period and 1 watt of heat during the off period. These conditions are disclosed by curve E in Figure 2.

Curve F of Figure 2 shows the setting of the outdoor controller to correct for both overheating during severe weather and underheating during mild weather. Curve F represents the application of 9 watts of heat to the outdoor controller during the on period and 0 watts of heat during the off period. Curve G represents the setting of the outdoor controller to compensate for underheating during severe weather and overheating during mild weather. Curve G is obtained from a setting of the control system wherein 7 watts of heat are supplied to the outdoor controller during the on period and 2 watts of heat during the off period.

Tabulated below with respect to the various curves illustrated in Figure 2 are the watts of heat supplied to the outdoor controller during the on period and the watts of heat supplied to the outdoor controller during the off period with a constant contact setting of 80°.

A—8 watts "on",—1 watt "off";
B—8 watts "on",—0 watt "off";
C—8 watts "on",—2 watts "off";
D—9 watts "on",—1 watt "off";
E—7 watts "on",—1 watt "off";
F—9 watts "on",—0 watt "off";
G—7 watts "on",—2 watts "off".

From the above it is seen that as far as the temperature and percent of time curves as illustrated in Figure 2 are concerned, the improved system of Figure 1 operates identically with that of the above referred to Taylor application. However, all of the adjustments that are required to be made can be made by two variable resistances conveniently located at some point such as a panel board in the basement of the building. Climbing out of the building to adjust the contact settings is not necessary in order to properly install and adjust the system as is required in the above referred to Taylor application. Therefore, much time and expense are saved by the use of the system illustrated in Figure 1.

In the system of the above referred to Taylor application, both the rate of heating and the rate of cooling of the outdoor controller are dependent upon the amount of heat supplied thereto and the setting of the contacts. In other words, the on periods as well as the off periods are dependent upon both the heat supplied to the outdoor controller and the setting of the contacts. Adjustment of the contact settings and the heat supply to change the operation of the Taylor system from curve A of Figure 2 to curves B and C not only varies the off periods but also varies the on periods. Likewise, adjustment of the heat supply to the outdoor controller to change the operating characteristics of the system from curve A of Figure 2 to curves D and E not only varies the on periods but also varies the off periods. That this is true has been found by experience and by reason of these adjustments wherein both the on periods and the off periods are varied, the setting and placing in proper operation of the Taylor system becomes quite complex.

In contradistinction to the Taylor system, the system of Figure 1 may be adjusted by varying the on periods while maintaining the off periods substantially constant and by varying the off periods while maintaining the on periods substantially constant. Specifically, changing the operation of the system from that of curve A of Figure 2 to curves B and C of Figure 2, the off periods are varied while the on periods are maintained substantially constant. Likewise, changing the operation represented by curve A to the operation represented by curves D and E is accomplished by adjusting the on periods and maintaining the off periods substantially constant. The manner in which this type of adjustment is obtained is diagrammatically illustrated in Figure 3.

Figure 3:
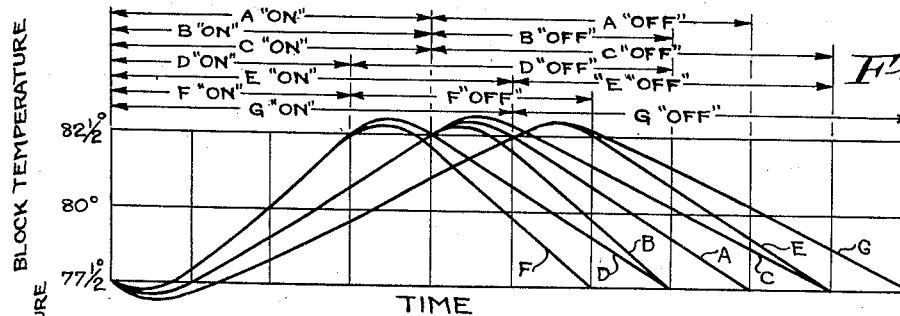
Figure 3 is a time temperature chart showing the time temperature cycle obtained by the apparatus disclosed in Figure 1.

Referring now to Figure 3, it is assumed that the building has a design temperature of 0°, that the contact settings are set at 77½° and 82½° to give an average temperature setting of 80°, that 8 watts of heat are supplied to the controller during the on period and that 1 watt is supplied during the off period and that the outdoor temperature is 35°, therefore, the system will be on 50% of the time and off 50% of the time, as pointed out in connection with Figure 2. This mode of operation is shown by curve A of Figure 3 wherein the on period equals the off period.

If the system underheats during mild weather, it is desirable to shorten the cooling or off period of the outdoor controller. This is accomplished by decreasing the number of watts supplied to the outdoor controller during the off period from 1 watt to 0 watts, for example, and this mode of operation is illustrated by curve B of Figure 3 wherein the rate of heating is the same as that of curve A of Figure 3, but since less heat is supplied to the outdoor controller during the off period, the outdoor controller will cool down faster along the curve B of Figure 3 whereby the off period is shortened while the on period is maintained substantially constant.

If overheating should occur during mild weather, it is desirable to lengthen the off period while the on period is maintained substantially constant. This mode of operation is illustrated by curve C of Figure 3 wherein 2 watts of heat are supplied to the outdoor controller during the off period. In this manner, the rate of cooling of the outdoor controller is slowed down while the rate of heating is maintained the same. Therefore, when 2 watts of heat are supplied to the outdoor controller during the off period and 8 watts are supplied during the on period, the on period is maintained substantially constant while the off period is lengthened.

If it is found that the system overheats during severe weather, it is desirable to shorten the on periods but still maintain the off periods substantially constant. This is accomplished by adding 9 watts of heat to the outdoor controller during the on period and 1 watt of heat during the off period, which mode of operation is shown by curve D of Figure 3. By reason of this supply of heat to the outdoor controller during the on period and the off period, the on period is shortened while the off period remains the same.

If underheating occurs during severe weather, it is desirable to increase the on period and maintain the off period substantially constant. This may be accomplished by adding 7 watts of heat during the on period and 1 watt during the off period. The operation of the system so adjusted is illustrated by curve E of Figure 3 wherein the off period is maintained substantially constant and the on period is lengthened.

If overheating occurs during severe weather and underheating occurs during mild weather, 9 watts of heat are added during the on period and 0 watts of heat are added during the off period whereby the system operates in the manner shown by curve F of Figure 3 wherein both the on period and the off period are shortened but these periods remain the same when the outdoor temperature is 35°. Likewise, if underheating during severe weather and overheating during mild weather occurs, 7 watts of heat are added during the on period and 2 watts are added during the off period whereby the system operates in the manner disclosed by curve G of Figure 3 wherein both the on period and the off period are lengthened but the on and off periods of curve G are equal at 35° outdoor temperature.

From the above it is seen that adjustment of the variable resistance 83 which controls the supply of heat during the on period primarily affects the on timing while adjustment of the variable resistance 102 which controls the supply of heat to the outdoor controller during the off period primarily affects the off period. In this manner, the on periods may be adjusted while the off periods are maintained substantially constant, and also, the off periods may be adjusted while the on periods are maintained substantially constant. This mode of operation is made possible by reason of the fact that the contact settings need not be adjusted to vary the average temperature setting of the outdoor controller which is not true in the above referred to Taylor application. By reason of the independent adjustments of the on periods and the off periods, the setting and placing in operation of the control system is materially simplified which, when considered in connection with the fact that the adjustments may be made by two conveniently located variable resistances, the time and expense for installing and servicing the system is minimized.

Figure 4:
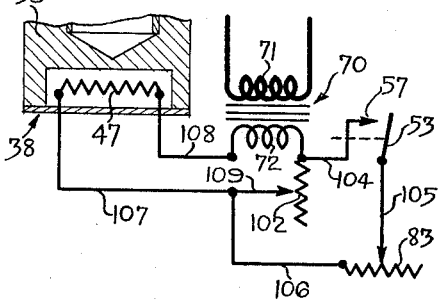
Figures 4 and 5 are partial diagrammatic views showing modifications of the control system disclosed in Figure 1 wherein substantially the same mode of operation is obtained.

Referring now to Figure 4, I have shown a slightly different manner for controlling the supply of heat to the outdoor controller which gives substantially the same results as that of Figure 1. A portion of the outdoor controller is generally designated at 38. The same transformer 70 may be utilized and the same relay 50 having the switch arm 53 engaging the contact 57 may also be utilized. However, the contact 59 which cooperates with the switch arm 53 of Figure 1 is omitted in Figure 4. As in Figure 1, the supply of heat to the outdoor controller during the on period is controlled by the variable resistance 83 and the supply of heat during the off period is controlled by the variable resistance 102. When the relay 50 is energized upon a call for heat by the outdoor controller so as to move the switch arm 53 into engagement with the contact 57, a circuit is completed from the secondary 72 of the transformer 70 through wire 104, contact 57, switch arm 53, wire 105, variable resistance 83, wires 106 and 107, heater 47, and wire 108 back to the secondary 72. Therefore, the variable resistance 83 controls the supply of heat to the outdoor controller 38 during the on period. When the outdoor controller is satisfied, the relay 50 drops out so as to move the switch 53 out of engagement with the contact 57 and heat is supplied to the outdoor controller 38 during this off period from the secondary 72 through variable resistance 102, wires 109 and 107, heater 47 and wire 108 back to the secondary 72. By suitably adjusting the variable resistances 102 and 83 so as to supply the correct number of watts to the outdoor controller 38 during the on periods and the off periods in the manner pointed out in connection with Figure 1, the system of Figure 4 will operate substantially the same as Figure 1. Since the variable resistance 102 is necessarily of a relatively high resistance with respect to variable resistance 83, adjustment thereof for varying the supply of heat to the outdoor controller during the off period will not materially affect the supply of heat during the on period and, therefore, this system will operate substantially the same as that of Figure 1.

Figure 5:
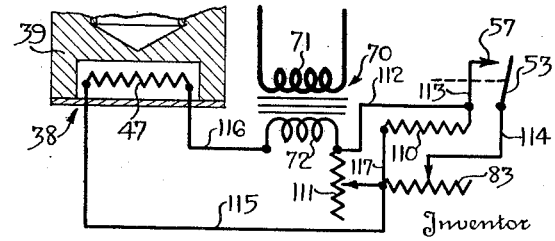

Referring now to Figure 5, the system for supplying heat to the outdoor controller is substantially the same as that of Figure 4 with the exception that the variable resistance 102 which bleeds heat to the outdoor controller is shown to comprise a fixed resistance 110 and a variable shunt resistance 111 whereby finer adjustments of the heat supplied during the off period may be obtained. When the outdoor controller calls for heat, a circuit is completed from the secondary 72 through wires 112 and 113, contact 57, switch arm 53, wire 114, variable resistance 83, wire 115, heater 47, and wire 116 back to the secondary 72. Adjustment of the variable resistance 83, therefore, varies the supply of heat to the outdoor controller during the on period. When the outdoor controller is satisfied, heat is supplied to the outdoor controller from the secondary 72 through wire 112, fixed resistance 110, wires 117 and 115, heater 47, and wire 116 back to the secondary 72. The variable resistance 111 is in parallel with the fixed resistance 110 and by suitably adjusting the variable resistance 111, the supply of heat to the outdoor controller 38 may be varied during the off period. Here as in the modification shown by Figure 4, the resistance values of the resistances 111 and 110 are much greater than that of variable resistance 83 and, therefore, adjustment of the variable shunt resistance 111 has little or no effect upon the amount of heat supplied to the outdoor controller when the outdoor controller is calling for heat. The variable resistances 83 and 111 of Figure 5 may, therefore, be adjusted to supply the correct amounts of heat to the outdoor controller during the on periods and off periods to properly adjust the same for accurate control of the building heating system.

Referring now to Figure 6, I have shown a further modification wherein the control system may be adjusted from a remote point such as the basement of the building and wherein the on periods may be adjusted while the off periods are maintained substantially constant and the off periods may be adjusted while the on periods are maintained substantially constant. The method of accomplishing these results, however, is different than that disclosed in Figure 1. For purposes of illustration the same building heating apparatus is shown including the radiator 12 and the valve 16. The motor 20 for operating the valve 16 is the same as that of Figure 1 and the motor is controlled by a relay 50 in the same manner as in Figure 1. The relay 50 is identical to that of Figure 1 with the exception that the out contact 59 is omitted. The outdoor controller 38 is in all respects the same as that of Figure 1 with the exception that the bimetallic element 41 of the outdoor controller is directly influenced by an auxiliary heater 49. In other words, the bimetallic element 41 is more responsive to the heating action of the auxiliary heater 49 than it is to the heating action of the main heater 47 by reason of the fact that the auxiliary heating element 49 is located in close proximity to the bimetallic element 41 while the main heating element 47 must operate through the mass 39 of the outdoor controller 38.

When the outdoor controller calls for heat so as to energize the relay 50, a circuit is completed from the secondary 72 through wire 120, contact 57, switch arm 53, wires 121 and 122, variable resistance 123, wire 124, main heater 47, and wires 125 and 126 back to the secondary 72. Completion of this circuit causes energization of the main heating element 47 to heat the mass 39 of the outdoor controller 38. The amount of heat supplied to the main heater 47 is adjusted by manipulation of the variable resistance 123. Also, when the relay 50 is energized by reason of a call for heat by the outdoor controller 38, a circuit is completed from the secondary 72 through wire 120, contact 57, switch arm 53, wire 121, variable resistance 127, wire 128, auxiliary heater 49, and wires 129 and 126 back to the secondary 72. Completion of this circuit causes energization of the auxiliary heating element 49 and the amount of heat given off by the auxiliary heater 49 may be adjusted by manipulation of the variable resistance 127. Therefore, it is seen that when the outdoor controller calls for heat, heat is supplied to the building, heat is supplied to the block 39 of the outdoor controller 38, and heat is supplied to the bimetallic element 41 of the outdoor controller 38.

Assume now that the design temperature of the building is 0° and that the contact settings of the outdoor controller are such that when the temperature of the bimetallic element 41 decreases to 67½°, the relay 50 is energized and when the temperature of the bimetallic element 41 increases to 72½°, the relay 50 is deenergized. Assume further that 2 watts of heat are supplied by the bimetallic element 41 and that 7 watts of heat are supplied to the metallic block 39 when the outdoor controller is calling for heat. Since the auxiliary heater 49 is located in close proximity to the bimetallic element 41, the bimetallic element 41 will be heated to 72½° before the block temperature rises to 72½°. Therefore, the relay 50 is deenergized before the block 39 is completely heated.

Figure 7:
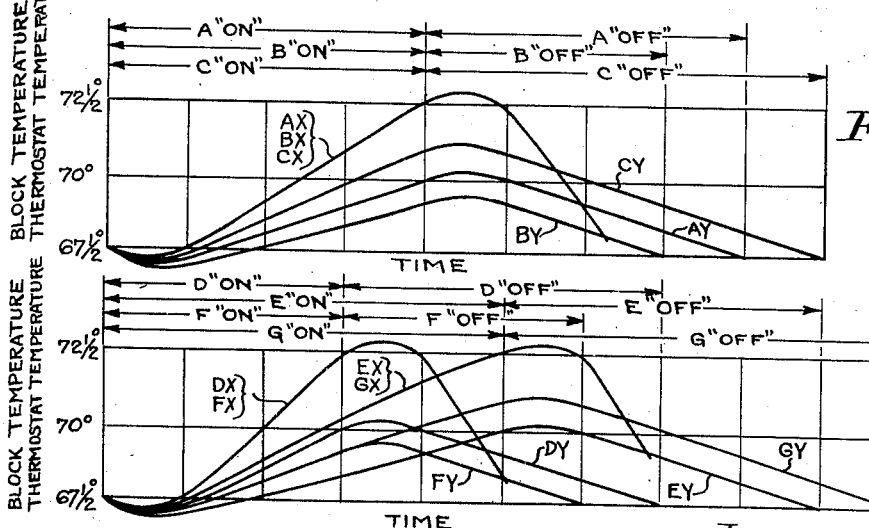
Figures 7 and 8 are time temperature charts showing the cycle of operation obtained by the structure shown in Figure 6.
Figure 8:
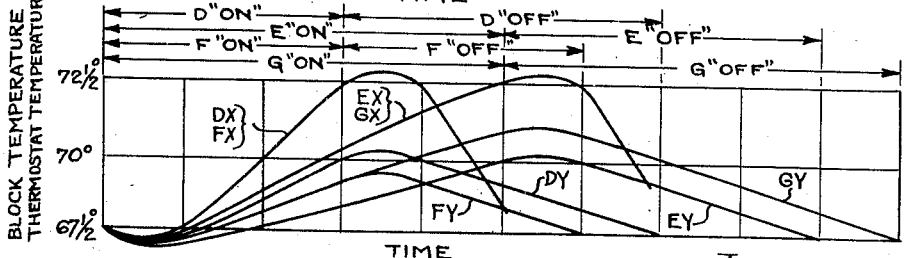

Referring now to Figures 7 and 8, there is disclosed a time temperature chart wherein the curves designated X illustrate the temperature of the bimetallic element 41 and wherein the curves Y designate the temperature of the mass 39. When the temperature of the bimetallic element 41 and consequently the temperature of the mass 39 decreases to 67½°, the relay 50 is energized to energize the main and auxiliary heaters and to supply heat to the building. When the temperature of the bimetallic element 41 rises to 72½°, the relay 50 is deenergized to prevent the further supply of heat to the building and to the outdoor controller. However, at this time the temperature of the block has increased, for example, only to 70°. The bimetallic element will then cool down to the temperature of the block and when the block temperature has decreased to 67½°, the relay will again be energized. This mode of operation is disclosed by the curves AX and AY of Figure 7. If it is assumed that the outdoor temperature is 35° and that the mass of the block 39 is properly selected, the on periods will be equal to the off periods and the system will operate in accordance with the curve A of Figure 2 in identically the same manner as does the above referred to Taylor system and the system of Figure 1.

If it be found that the system works satisfactory during cold weather but underheats during mild weather, the off periods must be shortened. This may be accomplished by manipulating the variable resistance 123 to decrease the supply of heat to the block 39 so that it will not heat up as far and, therefore, will not take as long to cool. However, the temperature of the bimetallic element during the on period is primarily affected by the auxiliary heater 49 and since the number of watts delivered to the auxiliary heater 49 is maintained the same, the curve BX will be the same as curve AX and the on period will remain the same. The off period is determined by the time it takes the block to cool from the value to which it is heated down to 67½°. These conditions are illustrated by the curves BX and BY of Figure 7 and it is seen that the on period under these conditions is the same while the off period has decreased. Curves BX and BY represent the application of 2 watts of heat by the auxiliary heater 49 and 6 watts by the main heater 47.

If on the other hand, it is found that the system overheats during mild weather, the off period should be lengthened. This may be accomplished by increasing the supply of heat to the block 39 so that it will take longer to cool. These conditions are shown by the curves CX and CY of Figure 7 wherein the on period is maintained the same while the off period is lengthened. Under these conditions 2 watts of heat are supplied by the auxiliary heater 49 and 8 watts by the main heater 47.

From the above it is seen that manipulation of the variable resistance 123 which controls the supply of heat to the main heater 47 varies the off periods of the heating system but maintains the on periods substantially constant.

If it be found that the control system operates satisfactory during mild weather but overheats during severe weather, this means that the on period should be shortened while the off period should be maintained the same. This may be accomplished by increasing the supply of heat to the auxiliary heater 49 whereupon the bimetallic element 41 is heated up to 72½° quicker. If the amount of heat to the block is increased a proportionate amount, the off period under these conditions may be maintained the same. The operation of the system adjusted in this manner wherein 3 watts of heat are supplied by the auxiliary heater 49 and 8 watts of heat are supplied by the main heater 47 is shown by the curves DX and DY of Figure 8. From this it is seen that the on period is shortened and the off period is maintained substantially the same.

If the system underheats during severe weather, the variable resistance 123 may be adjusted to deliver 6 watts to the heater 47 and the variable resistance 127 may be adjusted to deliver 1 watt to the auxiliary heater 49. Under these conditions, it will take longer for the temperature of the bimetallic element 41 to be raised to 72½° and therefore the on period will be lengthened while the off period remains substantially the same. These conditions are illustrated by the curves EX and EY of Figure 8.

In order to correct for both overheating during severe weather and underheating during mild weather, the variable resistances 123 and 127 may be adjusted to supply 3 watts to the auxiliary heater 49 and 7 watts to the main heater 47 and 7 watts to the main heater 47 and under these conditions, which are shown by curves FX and FY, both the on and off periods are shortened. In order to compensate for underheating during severe weather and overheating during mild weather, the amount of heat supplied by the auxiliary heater 49 may be adjusted to 1 watt and the amount of heat supplied by the main heater 27 may be adjusted to 7 watts and under these conditions both the one period and the off period may be increased. These conditions are illustrated by the curves GX and GY of Figure 8.

By suitably adjusting the mechanism shown in Figure 6 in the manner pointed out immediately above, the temperature and percentage of total time curves of this system will be the same as those of the above referred to Taylor application and those of the construction shown in Figure 1. In the modification shown by Figure 6, the contact settings remain the same and may be factory calibrated. Tabulated below for contact settings of 67½° and 72½° are, respectively, the watts supplied to the auxiliary heater and the watts supplied to the main heater.

A—2 watts—7 watts;
B—2 watts—6 watts;
C—2 watts—8 watts;
D—3 watts—8 watts;
E—1 watt — 6 watts;
F—3 watts—7 watts;
G—1 watt —7 watts.

From the above it is seen that I have provided a control system as illustrated in Figure 6 wherein all of the necessary adjustments for the control system may be made at some remote point such as the basement of the building, and wherein the on periods and the off periods may be adjusted independently of each other.

Figure 9:
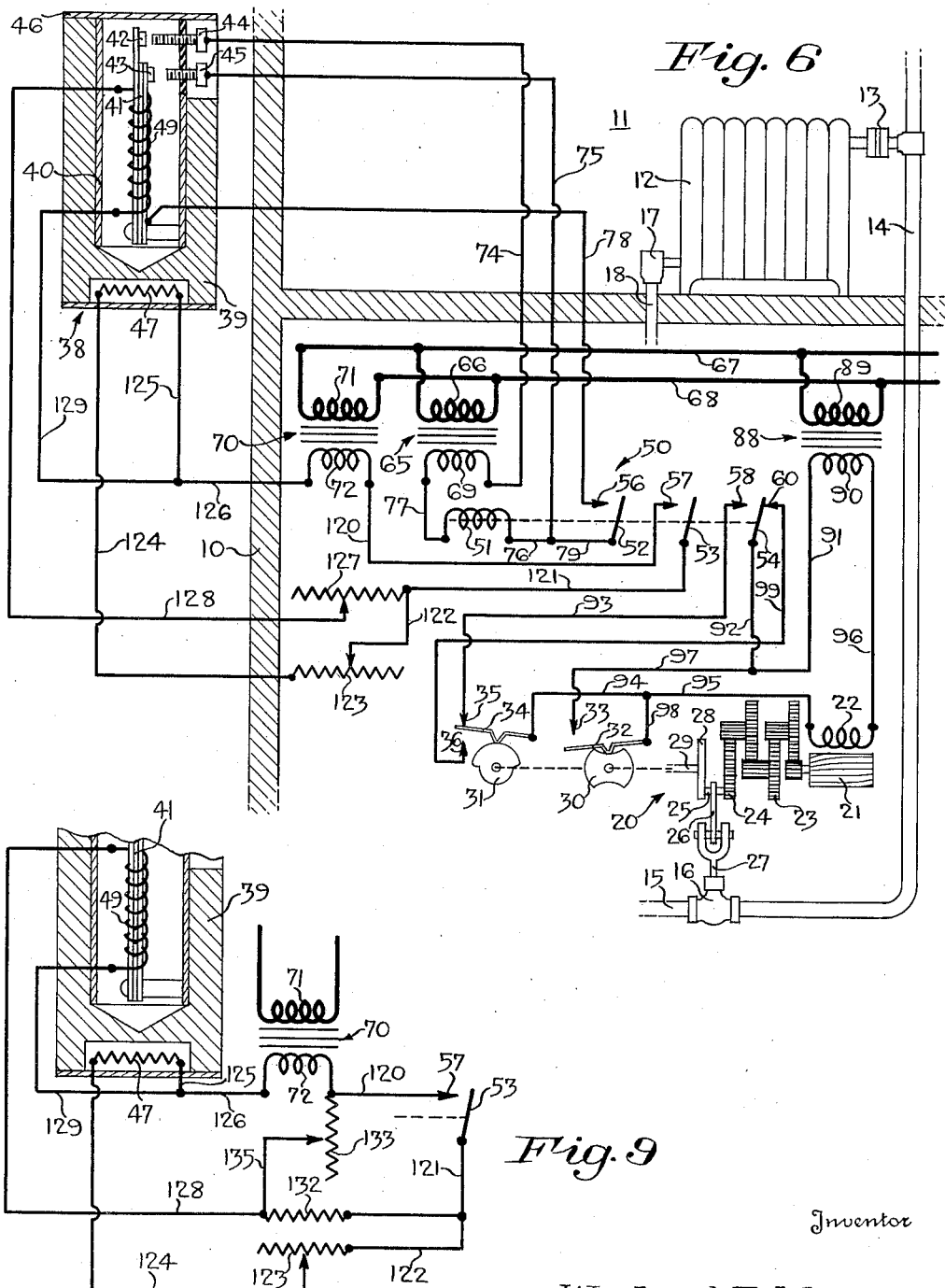
Figure 9 is a modification of the construction shown in Figure 6 for obtaining substantially the same results as in Figure 6.

Referring now to Figure 9, I have shown a slightly different manner of controlling the amount of heat supplied by the auxiliary heater 49. In this connection, I utilize a fixed resistance 132 and a shunt resistance 133 whereby a slightly more accurate control of the auxiliary heater 49 may be obtained. The operation of this modification is apparent and, therefore, a further description is not considered necessary.

From the above it is seen that I have provided control systems of the type described wherein the various adjustments may be made from a remote point by suitably manipulating variable resistances and wherein the off periods and the on periods may be adjusted with respect to each other. By reason of these adjustments, faulty operation of a system of the type described may be easily made to operate correctly.

In order to properly operate a heating system during mild weather, the heating system must be turned on sufficiently long to completely saturate the most remote radiator during mild weather and since the differential of the outdoor controller determines the length of the on period, the contacts must be so set that heat will be supplied to the most remotely located radiator during mild weather. Therefore, in order to properly install the heating systems outlined above, the contact settings thereof must be adjusted to accomplish this result. In the above description, it is assumed that a 5 degree differential contact setting was sufficient to completely saturate all of the radiators during mild weather. This differential setting must be determined by tests, and after the proper differential setting is once obtained, further adjustments of the contacts are not necessary.

Figure 10:
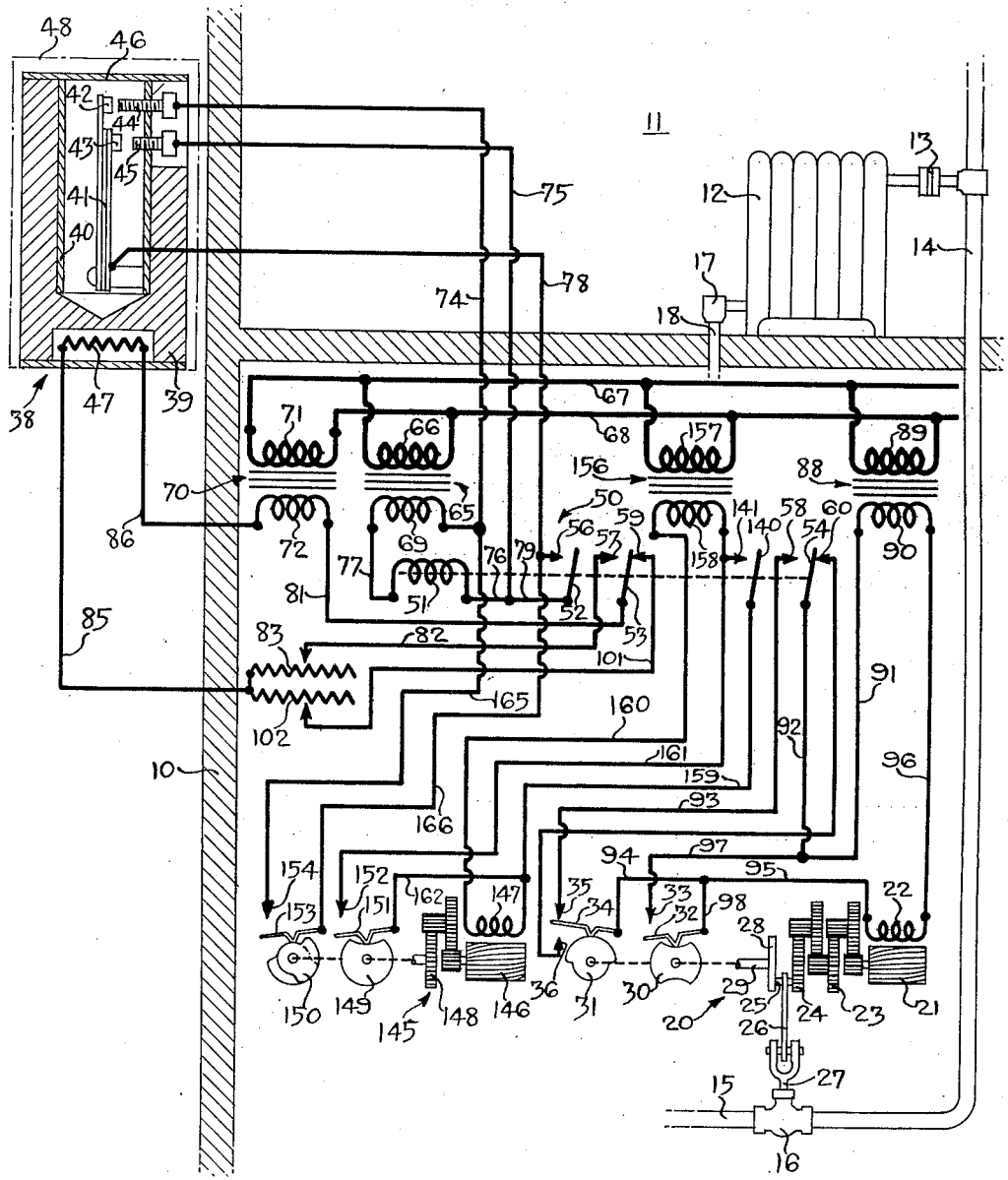
Figure 10 is a further modification utilizing a mechanical timer for obtaining the desired results.

Provision is made in Figure 10 for remotely adjusting the minimum on period of the heating system so that the heating system will completely saturate the most remotely located radiator during mild weather. By reason of the construction of Figure 10, the contacts may be factory calibrated and no further adjustments thereof are necessary. For purposes of illustration, this further adjusting means is shown as applied to the system of Figure 1. All of the structure shown and described in connection with Figure 1 is shown in Figure 10, including the same outdoor controller 38, the same relay 50, the same variable resistance 83 and 102, the same valve motor 20, and the same wiring connections between these various elements. In Figure 10, the relay 50 additionally operates a switch arm 140 with respect to a contact 141, the arrangement being such that when the relay coil 51 is energized, the switch arm 140 is moved into engagement with the contact 141. The switch arm 140 and the contact 141 control the operation of a timing device, generally designated at 145. This timing device 145 may comprise a rotor 146 operated by a field winding 147. Through a reduction gear train 148 the rotor 146 operates cams 149 and 150. The cam 149 operates a switch arm 151 with respect to a contact 152 for performing a maintaining function for the timing device. The cam 150 operates a switch arm 153 with respect to contact 154 which performs a maintaining function for the relay 50.

Power is supplied to the timing device 145 by means of a step-down transformer 156 having a primary 157 connected across the line wires 67 and 68 and a secondary 158. Upon a call for heat by the outdoor controller 38 so as to energize the relay 50, the switch arm 140 moves into engagement with the contact 141 to complete a circuit from the secondary 158 through contact 141, switch arm 140, wire 159, field winding 147, and wire 160 back to the secondary 158. Completion of this circuit starts operation of the timing device 145 which causes movement of the switch arm 151 into engagement with the contact 152. This completes a maintaining circuit from the secondary 158 through wire 161, contact 152, switch arm 151, wire 162, field winding 147, and wire 160 back to the secondary 158. Completion of this circuit maintains the timing device 145 in operation until such time as the timing device has made one complete revolution.

For purposes of illustration, it is assumed that the timing device 145 makes one complete revolution in five minutes time.

When the relay 50 is energized upon a call for heat by the outdoor controller which supplies heat to the outdoor controller and to the building and which places the timing device 145 in operation, a circuit is completed from the secondary 69 of the step-down transformer 65 through wire 165, contact 154 and switch arm 153 of the timing device 145, wire 166, contact 56, switch arm 52, wires 79 and 76, relay coil 51 and wire 77 back to the secondary 69. This maintaining circuit for the relay 51 maintains the relay 51 energized as long as the switch arm 153 is in engagement with contact 154. Therefore, when the timing device is placed in operation, the relay 50 is maintained energized irrespective of the condition of the outdoor controller 38 for a predetermined time dependent upon the timing cycle of the timing device 145. The timing cycle of the timing device 145 may be adjusted in any number of ways and these various ways of adjusting this timing device are within the contemplation of this invention. For instance, the speed of rotation of the timing device may be varied, interchangeable gear trains may be utilized, or the cam 150 which operates the switch arm 153 may be made adjustable as shown in Figure 10. With the adjustable cam 150 adjusted in the manner shown in the drawings, the relay coil 51 will be maintained energized following initial energization thereof for a period of substantially three minutes. Therefore, a minimum on period of three minutes is assured every time that the outdoor controller calls for heat and therefore the supply of heating fluid to the most remotely located radiators of the building during mild weather is assured. If a four minute on period or a five minute on period is required for supplying heating fluid to the most remotely located radiator, the cam 150 may be adjusted to maintain the switch arm 153 in engagement with the contact 154 for four or five minutes, respectively.

From the above it is seen that if the outdoor controller calls for heat and the weather is extremely mild so that it would normally only supply heat to the building and the outdoor controller, say for two minutes, the timing device will supply heat for a minimum period determined by the timing device to assure equal distribution of the heating fluid through the radiation system. If the outdoor controller calls for heat for a greater length of time, say 15 minutes, heat will be supplied to the building and to the outdoor controller for this fifteen minute period and the timing device will have substantially no effect.

From the above it is seen that I have provided a complete control system wherein all of the adjustments that are necessary for the satisfactory operation of the system may be made from a remote point and the climbing out of the building by service men or installation men is not necessary.

The various temperature values, heat values, time values, and curves used in the explanation of this invention are for purposes of illustration only and are not to be construed in a limiting sense. Various other forms of this invention may become obvious to those skilled in the art and therefore this invention is to be limited only by the scope of the appended claims and prior art.

I claim as my invention:

1. In a heating system for a building, the combination of heating means for the building, a controller of substantial mass located outside of the building and subject to the same atmospheric conditions as the building, said controller including thermostatic means responsive to the temperature thereof and heating means, means controlled by the thermostatic means for turning on and turning off the building heating means, means controlled by the thermostatic means for controlling the controller heating means to supply one amount of heat to the controller during the on period and to supply another amount of heat to the controller during the off period.

2. In a heating system for a building, the combination of heating means for the building, a controller of substantial mass located outside of the building and subject to the same atmospheric conditions as the building, said controller including thermostatic means responsive to the temperature thereof and heating means, means controlled by the thermostatic means for turning on and turning off the building heating means, means controlled by the thermostatic means for controlling the controller heating means to supply one amount of heat to the controller during the on period and to supply another amount of heat to the controller during the off period, and means for adjusting the heating effect of the controller heating means to vary independently the on and off periods of the building heating means.

3. In a heating system for a building including, a source of heating fluid, a plurality of heat exchangers and control means for controlling the delivery of heating fluid to the heat exchangers, the combination of, a controller subject to the same atmospheric conditions as the building for controlling the control means to turn on and turn off the supply of heating fluid to the heat exchangers, and means operative to deliver heating fluid to the heat exchangers for at least a predetermined time interval when the supply of heating fluid is turned on to insure that heating fluid is delivered to the most remote heat exchanger.

4. In a heating system for a building having a plurality of heat exchangers, the combination of, control means for controlling the delivery of heating fluid to the heat exchangers, a controller outside of the building and subject to the same atmospheric conditions as the building, said controller including thermostatic means and heating means, means controlled by the thermostatic means for controlling said control means to turn on and turn off the supply of heating fluid to the heat exchangers, means controlled by the thermostatic means for controlling the heating effect of the controller heating means to controlling the on and off periods, and means placed in operation upon the turning on of the heating fluid to continue the supply of heating fluid to the heat exchangers for at least a predetermined time interval to insure the delivery of heating fluid to the most remote heat exchanger.

5. In a heating system for a building including, a source of heating fluid, a plurality of heat exchangers and control means for controlling the delivery of heating fluid to the heat exchangers, the combination of, a controller subject to the same atmospheric conditions as the building for controlling the control means to turn on and turn off the supply of heating fluid to the heat exchangers, means operative to deliver heating fluid to the heat exchangers for at least a predetermined time interval when the supply of heating fluid is turned on to insure that heating fluid is delivered to the most remote heat exchanger, and means for adjusting said last named means to vary the predetermined time interval.

6. In a heating system for a building having a plurality of heat exchangers, the combination of, control means for controlling the delivery of heating fluid to the heat exchangers, a controller outside of the building and subject to the same atmospheric conditions as the building, said controller including thermostatic means and heating means, means controlled by the thermostatic means for controlling said control means to turn on and turn off the supply of heating fluid to the heat exchangers, means controlled by the thermostatic means for controlling the heating effect of the controller heating means to control the on and off periods, means placed in operation upon the turning on of the heating fluid to continue the supply of heating fluid to the heat exchangers for at least a predetermined time interval to insure the delivery of heating fluid to the most remote heat exchanger, and means for adjusting said last named means to vary the predetermined time interval.

7. In a heating system for an enclosure, the combination of, heating means for the enclosure, a controller of substantial mass outside of the enclosure and subject to the same atmospheric conditions as the enclosure, said controller including thermostatic means responsive to the temperature thereof and main heating means for heating the controller, means controlled by the thermostatic means for turning on both heating means when the temperature thereof decreases to a predetermined low value and for turning off both heating means when the temperature thereof rises to a predetermined high value, auxiliary heating means for the controller, said main heating means and said auxiliary heating means having means for adjusting the heating effect thereof to adjust independently the length of the on and off periods of the thermostatic means.

8. In a heating system for an enclosure, the combination of, heating means for the enclosure, a controller of substantial mass outside of the enclosure and subject to the same atmospheric conditions as the enclosure, said controller including thermostatic means responsive to the temperature thereof and main heating means for heating the controller, means controlled by the thermostatic means for turning on both heating means when the temperature thereof decreases to a predetermined low value and for turning off both heating means when the temperature thereof rises to a predetermined high value, auxiliary heating means for heating the controller during the off period, said main heating means and said auxiliary heating means having means for adjusting the heating effect thereof to adjust independently the length of the on and off periods of the thermostatic means.

9. In a heating system for an enclosure, the combination of, heating means for the enclosure, a controller of substantial mass outside of the enclosure and subject to the same atmospheric conditions as the enclosure, said controller including thermostatic means responsive to the temperature thereof and main heating means for heating the controller, means controlled by the thermostatic means for turning on both heating means when the temperature thereof decreases to a predetermined low value and for turning off both heating means when the temperature thereof rises to a predetermined high value, auxiliary heating means for heating primarily the thermostatic means during the on period, means for adjusting the heating effect of the main heating means to adjust primarily the length of the off period of the thermostatic means, and means for adjusting the heating effect of the auxiliary heating means to adjust primarily the length of the on period of the thermostatic means.

10. In a heating system for a building, the combination of, heating means for the building, a controller of substantial mass located outside of the building and subject to the same atmospheric conditions as the building, said controller including main and auxiliary heating means and thermostatic means, the thermostatic means being more responsive to the heating effect of the auxiliary heating means than the main heating means, means controlled by the thermostatic means for turning on all of the heating means when the temperature thereof decreases to a predetermined low value and for turning off all of the heating means when the temperature thereof rises to a predetermined high value, and means for independently adjusting the heating effects of the main and auxiliary heating means to adjust independently the lengths of the on and off periods.

11. In a heating system for a building, the combination of, heating means for the building, a controller of substantial mass located outside of the building and subject to the same atmospheric conditions as the building, said controller including main and auxiliary heating means and thermostatic means, the thermostatic means being more responsive to the heating effect of the auxiliary heating means than the main heating means, means controlled by the thermostatic means for turning on all of the heating means when the temperature thereof decreases to a predetermined low value and for turning off all of the heating means when the temperature thereof rises to a predetermined high value, and means for adjusting the heating effect of the main and auxiliary heating means to adjust independently the length of the on and off periods of the thermostatic means.

12. In a heating system for an enclosure, the combination of, heating means for the enclosure, a controller outside of the enclosure and subject to the same atmospheric conditions as the enclosure, said controller including thermostatic means responsive to the temperature thereof and heating means for heating the controller, means controlled by the thermostatic means for controlling the enclosure heating means and the controller heating means to maintain desired temperature conditions in the enclosure and in the controller, means for continuously supplying additional heat to the controller, and means for adjusting the amount of additional heat supplied to the controller by said last mentioned means.

WAYLAND R. MILLER.